US009772067B2

(12) United States Patent
Bunz et al.

(10) Patent No.: US 9,772,067 B2
(45) Date of Patent: Sep. 26, 2017

(54) LASER PROCESSING MACHINES WITH BARRIER-FREE ACCESSES

(71) Applicant: TRUMPF Werkzeugmaschinen GmbH + Co. KG, Ditzingen (DE)

(72) Inventors: Andreas Bunz, Leinfelden-Echterdinger (DE); Detlef Breitling, Leonberg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 352 days.

(21) Appl. No.: 14/573,105

(22) Filed: Dec. 17, 2014

(65) Prior Publication Data
US 2015/0176763 A1    Jun. 25, 2015

(30) Foreign Application Priority Data
Dec. 20, 2013    (EP) ..................................... 13198967

(51) Int. Cl.
*B23K 26/70* (2014.01)
*F16P 3/02* (2006.01)
(Continued)

(52) U.S. Cl.
CPC .............. *F16P 3/02* (2013.01); *B23K 26/706* (2015.10); *B23K 37/006* (2013.01); *F16P 1/06* (2013.01)

(58) Field of Classification Search
CPC ....... B23K 26/706; B23K 37/006; F16P 1/06; F16P 3/02
(Continued)

(56) References Cited

U.S. PATENT DOCUMENTS 4,730,113 A * 3/1988 Edwards ................... F16P 1/06
219/121.62
6,147,323 A * 11/2000 Erickson .............. B23K 26/127
219/121.86
(Continued)

FOREIGN PATENT DOCUMENTS

CN        2880540 Y      3/2007
CN      201183172 Y      1/2009
(Continued)

OTHER PUBLICATIONS

Zah et al., "Entwicklung technischer Anlagensicherhaeitskonzepte fur Hochleistungslaser der neuesten Generation", Schweissen und Schneiden, DVS verlag Dusseldorf, Germany, Bd. 63, No. 3, English Abstract, Mar. 2011.
(Continued)

*Primary Examiner* — Geoffrey S Evans
(74) *Attorney, Agent, or Firm* — Fish & Richardson P.C.

(57) ABSTRACT

A laser processing machine arrangement includes a laser processing head for laser processing a workpiece, the workpiece comprising a processing zone from which laser radiation is emitted radially during operation of the laser processing head, a laser protection wall that surrounds the laser processing head and a danger region disposed around the laser processing head, the laser protection wall shielding the laser radiation that is emitted radially from the processing, and at least one opening in the laser protection wall, through which the danger region can be entered, wherein the laser protection wall and the at least one in the laser protection wall are arranged in such a manner that the at least one opening is completely shadowed by the laser protection wall or is completely shadowed with cooperation of the laser protection wall from the laser radiation during operation of the laser processing head.

17 Claims, 9 Drawing Sheets

(51) Int. Cl.
*B23K 37/00* (2006.01)
*F16P 1/06* (2006.01)

(58) Field of Classification Search
USPC .................................................. 219/121.86
See application file for complete search history.

(56) References Cited

U.S. PATENT DOCUMENTS

| | | | | |
|---|---|---|---|---|
| 2001/0054607 | A1* | 12/2001 | Pratt | B23K 26/12 219/121.86 |
| 2002/0134773 | A1* | 9/2002 | Pratt | B23K 26/12 219/121.86 |
| 2003/0146194 | A1* | 8/2003 | Bowker | D06B 11/0096 219/121.86 |
| 2007/0023406 | A1* | 2/2007 | Heberer | B23K 26/12 219/121.86 |
| 2008/0017620 | A1* | 1/2008 | Sukhman | B23K 26/12 219/121.86 |
| 2009/0045175 | A1* | 2/2009 | Nishihara | B23K 26/706 219/121.39 |
| 2013/0161300 | A1* | 6/2013 | Zeygerman | B23K 26/0876 219/121.78 |
| 2013/0248739 | A1 | 9/2013 | Weber et al. | |
| 2016/0228982 | A1* | 8/2016 | Haji | B23K 37/0235 |

FOREIGN PATENT DOCUMENTS

| | | |
|---|---|---|
| CN | 103158027 A | 6/2013 |
| DE | 29905817 U1 | 10/1999 |
| DE | 102010042564 B3 | 3/2012 |
| EP | 2540435 A1 | 1/2013 |
| GB | 2182746 | 5/1987 |
| JP | 2000024785 A | 1/2000 |
| WO | WO2011045098 A1 | 4/2011 |

OTHER PUBLICATIONS

Finn Power Company Brochure, "Combined Punching and Fiber Laser Cutting", Prima Industrie S.p.A., Collegno, Italy, printed Sep. 2010.

Trumpf Company Brochure, "TruMatic 3000 Fiber: Kombination hoch drei", English Abstract, Dec. 17, 2013.

* cited by examiner

LASER PROCESSING MACHINES WITH BARRIER-FREE ACCESSES

CROSS REFERENCE TO RELATED APPLICATION

This application claims priority under 35 U.S.C. §119(a) to European Application No. 13 198 967.5, filed on Dec. 20, 2013, the entire contents of which are hereby incorporated by reference.

TECHNICAL FIELD

The present disclosure relates to laser processing machine arrangements including laser protection walls and barrier-free accesses.

BACKGROUND

Using laser processing methods, in particular laser cutting and laser welding, it is possible to process workpieces, in particular metal sheets, in a highly precise manner. However, during laser processing operations, persons in surrounding areas must be protected from the laser radiation.

Laser radiation may in particular damage a person's eyes. In this instance, it is not only direct radiation from the laser beam which is dangerous, but also scattered light which is emitted from a processing zone (e.g., the illuminated region) on the workpiece. Such direct radiation and scattered light can lead to permanent damage in the region of the retina or pupil. A particular danger involves lasers in the non-visible radiation range, in particular infrared lasers, since the incident light in the eye is not immediately noticed and in particular does not activate the lid closure reflex.

In order to protect operating personnel, a shield (e.g., an internal shield) can be arranged locally on the laser processing head of a laser processing machine. In some embodiments, a local shielding device on a laser processing head having two brush-like shielding units can be moved relative to each other.

Local shielding units can screen the laser light which is propagated from a processing zone radially (e.g., in a linear direction) in slow operating modes, but not in rapid operating modes with the reliability required for optical safety of operating personnel in the environment. Thus, the laser processing machine is often additionally provided with an external shield. The external shield includes a laser protection wall of material (e.g., sheet metal, wood, or special discs) which is impermeable to the laser radiation used. The laser protection wall surrounds the laser processing head and at least a portion of the laser processing machine. The space inside the laser protection wall is referred to as a danger region since scattered laser radiation can in principle pass through it.

In some embodiments, a laser processing machine is surrounded with a closed machine cabin. Discharge of laser radiation is thereby reliably prevented, and noise pollution in the environment is thereby reduced. Access to the laser processing machine for operating personnel (e.g., to perform set-up operations on the laser processing head) is provided through doors, which, during operation of the laser processing head have to be closed.

In certain embodiments, laser processing and punching machines are surrounded entirely by a laser protection wall which has to be opened (e.g., with telescope-like doors) to allow people to enter the danger region. A disadvantage of such arrangements is that, in order for people to enter the danger region, doors, gates, or the like have to be opened. After completing manual operations on the laser processing machine, before continuing operation of the laser processing head, these doors have to be closed again in order to ensure laser safety. Manual opening of these doors is time-consuming and troublesome, in particular when a free hand is or even both hands are required for this. Automatic door opening systems are expensive, and in most cases, also delay access to the laser processing machine (e.g., to the danger region), and in particular, to the laser processing head.

SUMMARY

In some embodiments, a laser processing machine that is provided with an external shield provides an improved access to a danger region (e.g., including a laser processing head) of the laser processing machine.

In certain embodiments, a laser protection wall and at least one opening in the laser protection wall are arranged in such a manner that the at least one opening is completely shadowed by the laser protection wall or completely shadowed with the cooperation of the laser protection wall from the laser radiation which is emitted radially from the processing zone during operation of the laser processing head.

The laser protection wall is provided with at least one opening which is positioned in the laser protection wall in such a manner that the at least one opening is completely shadowed from the processing zone, from which the scattered laser radiation is radially emitted (e.g., in a linear direction) during operation of the laser processing head. The opening (e.g., a shadowed opening) is at least partially, and typically completely, shadowed by portions of the laser protection wall.

The laser protection wall thus serves not only to separate the danger region (e.g., the laser protection region) from the personnel region, but owing to the arrangement of the portions relative to the processing zone, is also capable of configuring one or more intermediate spaces which the light (e.g., propagating in a linear direction from the processing zone and blocked by the portions of the laser protection wall) cannot reach. With the portions of the laser protection wall, it is thus possible to configure an optical labyrinth which prevents propagation to the at least one shadowed opening.

The laser protection wall is preferably configured in such a manner that it completely surrounds the processing zone (e.g., over 360°) by portions which are mutually adjacent or which are offset relative to each other but which overlap azimuthally (with respect to the azimuth angle φ in spherical coordinates, with the horizontal plane through the processing zone as a reference plane). At an overlapping location, a shadowed intermediate space or a shadowed opening can be readily configured. The laser protection wall screens scattered light in a polar manner (with respect to the polar angle θ in spherical coordinates) at least in the angular range in which, as a result of the configuration of the workpiece (optionally taking into account workpiece supply operations) and the laser processing head (optionally taking into account a locally shadowing covering), the scattered light is anticipated. Typically, this is the case for a θ region of approximately +/−15° or less about the horizontal plane. However, it is also possible for the laser protection wall, optionally together with a laser protection ceiling or room ceiling and the floor, to provide a complete polar shield.

An opening which is shadowed does not require a sealing (e.g., a door) that is impermeable to laser radiation in order to ensure laser safety in a surrounding region (e.g., a personnel region) of the danger region. Since the shadowed opening is in any case not subjected to the scattered laser radiation, such a sealing would not further improve laser safety in the personnel region.

An opening which is shadowed can be readily used to access to the danger region (e.g., after switching off the laser processing head) to perform set-up operations. In principle, it is not necessary to open a door, a gate, or the like at the opening before entering the danger region, or to close a door at the opening after leaving the danger region. However, it should be ensured using appropriate means that, when the danger region is entered, in particular through a shadowed opening without a door, the laser processing head is or will be switched off. For this purpose, it is possible to use monitoring systems which provide appropriate means (generally switching off the laser beam of the laser processing head over the secure channel of the machine control) before or when the danger region is entered.

It should be noted that the laser protection wall may also have additional openings which are not shadowed and which should then be provided with doors of laser-impermeable material, with a switching off of the laser processing head being ensured when such a door is opened.

The danger region contains the laser processing head and at least a portion of the laser processing machine. Typically, the laser processing machine is completely arranged in the danger region. In particular, at least a portion of a workpiece supply and a workpiece which is currently undergoing a laser processing operation is generally completely contained in the danger region.

In a particularly advantageous embodiment of a laser processing machine arrangement, the at least one shadowed opening is constructed in a barrier-free manner. For access to the danger region, no barrier then needs to be opened, which is particularly user-friendly, time-saving, and structurally simple. In particular, there is not provided any door which blocks the opening during operation of the laser processing head. Alternatively, for example, a door which opens automatically on approach may be provided on the opening, the associated automatic system being able to be configured in a self-sufficient manner. This door does not need to be sealed with respect to laser radiation.

An embodiment is also preferred in which the at least one shadowed opening is disposed at floor level and extends at least 2.20 m in an upward direction. A person can thereby use the opening to access the danger region whilst in an upright state and without the risk of stumbling.

Another embodiment advantageously provides that the at least one shadowed opening be located with respect to the processing zone at least partially behind a shadowing portion of the laser protection wall. In particular, the shadowed opening has a front edge and a rear edge with respect to the spacing from the processing zone, and the front edge and the adjacent portion of the laser protection wall shadow the opening along a length of the opening that extends to the rear edge. This embodiment is structurally simple. Preferably, the shadowed opening is located completely behind a shadowing portion of the laser protection wall. It should be noted that portions of the opening can also be shielded, for example, by the workpiece, a workpiece supply system, the laser processing head, or a covering of the laser processing head so that a shadowing by the laser protection wall is not required at that location. The shadowing portion typically has a substantially vertical edge. The edges are typically orientated in a vertical manner and the spacing from the processing zone is viewed in the horizontal plane.

In some embodiments, a monitoring system registers entry of a control region that includes at least the danger region, and the monitoring system is constructed to automatically switch off the laser processing head when it registers entry of the control region. Owing to the monitoring system, the optical safety of persons entering the danger region is ensured. It should be noted that the monitoring system should be constructed so as to be redundant in order, to further ensure the optical safety of a person entering the danger region in the event that one or more components of the monitoring system fail. Typically, when the control region is entered, any machine movement (e.g., workpiece transport) in the control region or danger region is also stopped. The monitoring system can monitor either one or more boundary portions through which the control region (and the danger region) can be entered, mostly with vertically orientated light grilles. Additionally or alternatively, the monitoring system monitors the control region (and the danger region) as a whole, mostly with horizontally oriented light grilles or load sensors which register the weight of a person stepping onto the load sensors. The control region may coincide with the danger region. However, it is also possible to select the control region to be larger or extend further than the danger region. In this instance, an approach (e.g., an unauthorized approach) of the danger region (e.g., in front of a shadowed opening) is already used to switch off the laser processing head. It is generally simple to monitor the access to a control region which is configured substantially independently of the laser protection wall and the openings thereof in an optical manner (e.g., with photoelectric barriers or light grilles).

In some embodiments, the monitoring system is advantageously an optical monitoring system. In particular, the optical monitoring system may include a light grille. Optical monitoring systems are comparatively simple to install and operate reliably. It should be noted that, for various boundary portions (e.g., accesses to the control region), local sub-monitoring systems which are independent of each other (e.g., including their own transmitter and receiver) may be provided. In some embodiments, an integrated monitoring system having only one transmitter and only one receiver may be provided for multiple or all boundary portions. For example, a control beam may be directed over all boundary portions, and the interruption thereof indicates entry to any of the boundary portions involved. A light grille preferably has a resolution or a maximum spacing of 120 mm or less. In certain embodiments, the light grille preferably has a resolution or maximum spacing of 90 mm or less. Such configurations ensure particularly reliable switching off, even when only a single body part (e.g., the head) enters the danger region. Photoelectric barriers can also be used.

Advantageously, the monitoring system monitors at least one boundary portion of the control region and permits operation of the laser processing head only as long as the at least one boundary portion is identified as being free. The laser processing head is automatically switched off as soon as the at least one boundary portion is entered. Monitoring on the basis of boundary portions (e.g., accesses to the control region) is much simpler to carry out than spatially monitoring the entire control region. A boundary portion may be produced in particular by a shadowed opening in the laser protection wall, and the monitoring system automatically switches off the laser processing head when the danger region is entered through the opening. Alternatively, a boundary portion may be arranged upstream of a shadowed opening in the laser protection wall. A boundary portion is typically constructed in a planar manner and orientated vertically. It should be noted that the laser processing head may only resume operation both when all the boundary portions are indicated to be free, and when it has additionally been verified that all persons have left the danger region. To this end, there may in particular be provision for the person who has entered the control region to then have to confirm that he has left the control region (e.g., by pressing a button) from outside of the control region.

In certain embodiments, a boundary portion is constructed adjacent a shadowed opening so that a movable portion of the laser protection wall, which also delimits this shadowed opening, can be moved or pivoted between an opened position and a closed position. The opened position provides greater access to the danger region in comparison to the access provided by the shadowed opening. In the closed position, the access to the danger region is limited to the shadowed opening, and the monitoring system permits this boundary portion to be indicated as free only when the movable portion is in the closed position. Through the movable portion, it is possible to temporarily provide increased access to the danger region (e.g., in order to move a heavy repair device or bulky workpieces). The movable portion is generally not shadowed by scattered laser radiation so that when the portion is opened, switching off of the laser beam has to be carried out. When the associated shadowed opening can be indicated as free (e.g., only when the adjacent movable portion is closed), an implicit, particularly simple securing of the temporary access to the movable portion is thereby achieved.

In some embodiments, the monitoring system advantageously has two devices, in particular, a transmission device and a receiving device. One of these devices is arranged on the movable portion of the laser protection wall, in particular on the edge of the shadowed opening. The other device is arranged on a non-movable portion of the laser protection wall, in particular on the opposing edge of the shadowed opening. This construction has been found to be advantageous in practice and is simple to produce. Typically, this variant is produced with an optical monitoring system. Only in the closed position of the movable portion of the laser protection wall is the receiving device in a position in which it can register one or more uninterrupted control beams from the transmission device, which requires the identification of the opening as being free. One of the devices may also be a reflector, and the other device may be a combined transmission and receiving device.

In certain embodiments, a pre-warning system advantageously monitors a pre-warning portion which is located upstream of a boundary portion and which transmits an optical and/or acoustic pre-warning signal when the pre-warning portion is entered, in particular with the pre-warning portion being spaced apart from the boundary portion by at least 40 cm. Owing to the pre-warning system, unintentional entry of the control region, which would bring about an interruption of the workpiece processing operation, can be prevented. When the person entering the pre-warning portion notices the pre-warning signal, he can still pause before he enters the control region and consequently avoid interrupting the workpiece processing operation. The pre-warning portion is typically constructed in a planar manner and orientated vertically. The pre-warning system is in most cases constructed in an optical manner (e.g., with a photo-electric barrier).

In some embodiments, at least one movable laser protection shield is provided, wherein, in a deployed position of the laser protection shield, a region of the control region which also includes a region of the danger region is completely shadowed from the laser radiation emitted radially from the processing zone during operation of the laser processing head. The monitoring system is configured in such a manner that, with the laser protection shield in the deployed position, it does not automatically switch off the laser processing head when the region of the control region is entered. Furthermore, it is not possible to enter the remaining control region from the region of the control region at least with the laser protection shield in the deployed position. The region of the control region which can be shadowed by the laser protection shield can thereby be entered in parallel with primary processing (e.g., during a laser processing operation) in the remaining control region, for instance to provide workpieces to be processed or to remove workpieces which have been completely processed. The laser processing machine can thereby be used with particularly high capacity. Advantageously, an automation system (e.g., a workpiece transport system) is provided which can move workpieces with the laser protection shield in a retracted position from the shadowable region of the control region to the remaining control region or vice versa. With the laser protection shield in a retracted position, however, the region mentioned is generally not shadowed from scattered laser radiation so that, with the laser protection shield in the retracted position, the mentioned region of the control region also has to be monitored or kept free of people.

In certain embodiments, the laser protection wall further includes at least one additional opening which can be blocked with a laser protection door and through which the danger region can be entered, and in that, a protection system is provided which automatically switches off the laser processing head when the laser protection door is opened. Such additional doors may in particular be used to introduce heavy repair equipment or relatively large workpieces. Sliding gates or telescope-like doors are often used as laser protection doors. If desired, the control region may extend beyond the danger region, in front of such an additional opening. For example, stepping into the additional opening will cause switching off of the laser processing head.

In some embodiments, the laser radiation which is emitted radially from the processing zone during operation is partially shadowed by the workpiece, and/or by a workpiece supply system, and/or by the laser processing head, and/or by a casing of the laser processing head, and the laser protection wall partially in such shadowed spatial angular ranges, in particular in portions close to the ground, is constructed to be open. The laser protection wall may in this embodiment be limited to the spatial angular ranges which are significant for shadowing the personnel region around the danger region (e.g., to those spatial angular ranges which are not yet otherwise shadowed). By double-shadowing, no further improvement of personnel safety would be achieved in principle, but the radiation propagation from the processing zone has to be known in a reliable manner for this embodiment. The laser protection wall can then be made considerably cheaper.

In certain embodiments, the laser processing head has a laser with a wavelength in the non-visible range (e.g., in the infrared range). In particular, the laser may be a solid-state laser with a wavelength in the near infrared range (800 nm to 1400 nm). In the case of non-visible laser light, a suitable shadowing by a laser protection wall is particularly significant since people cannot perceive danger caused by the laser radiation (e.g., scattered laser radiation) with their eyes.

In some embodiments, the laser processing head advantageously has a laser whose laser beam is orientated in a vertical direction (e.g., in a downward direction). The location of the processing zone can at most thereby vary in a vertical direction, which makes a continuously azimuthally (in the peripheral direction) closed or overlapping arrangement of portions of the laser protection wall around the processing zone readily possible.

In certain embodiments, the laser processing machine arrangement advantageously has multiple laser processing heads which are surrounded by the laser protection wall. Accordingly, the laser protection wall and the at least one opening in the laser protection wall are arranged in such a manner that the at least one opening is completely shadowed by the laser protection wall from the laser radiation emitted radially from the respective associated processing zone during operation of each one of the laser processing heads. Owing to the use of multiple laser processing heads in the same danger region or control region, cost advantages can often be achieved. Furthermore, for various processing requirements (e.g., for cutting operations and welding operations), different lasers can be used, or the processing capacity is simply increased. In order to achieve a shadowing with respect to multiple processing zones which are horizontally offset with respect to each other, a shadowed opening can be configured at the end of a bent or angled path which is configured in the danger region and which is flanked by portions of the laser protection wall.

In some embodiments, the laser processing machine arrangement further has a punching head in the danger region. The workpiece processing of the arrangement thereby becomes more universal. A monitoring system which is configured for the laser safety and for safety of access can then also ensure the safety of the punching process.

Other aspects, features, and advantages will be apparent from the description, the drawings, and the claims. The features described above and those set out below may be used individually per se or together in any combination. The embodiments shown and described are not intended to be understood to be a conclusive listing but are instead of exemplary character.

DETAILED DESCRIPTION

Figure 3:
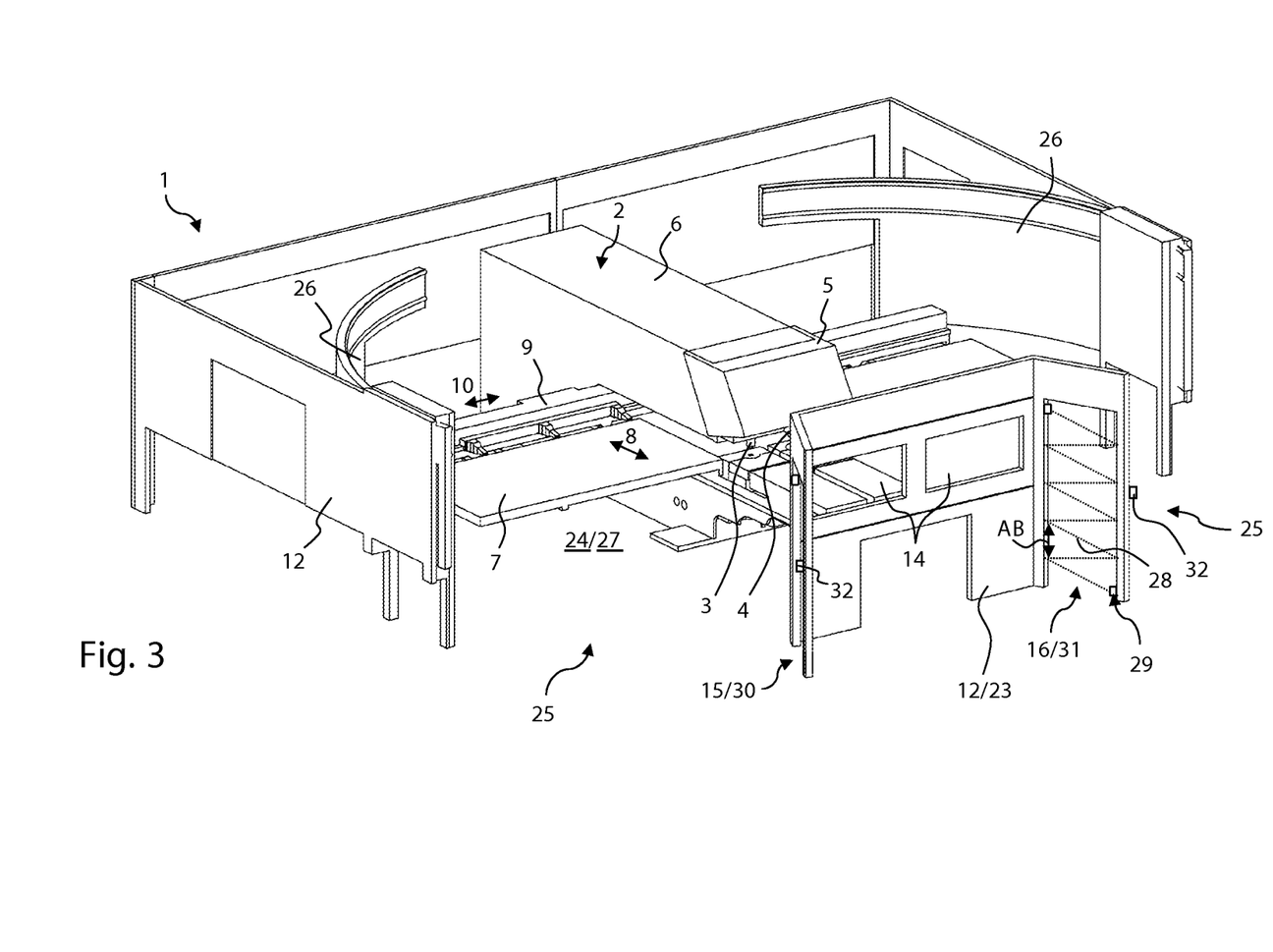
FIG. 3 shows a schematic perspective view of the laser processing machine arrangement of FIG. 2.

FIGS. 1 to 4 illustrate a first embodiment of a laser processing machine arrangement 1. As can be seen from FIG. 1 and FIG. 3, the arrangement 1 includes a laser processing machine 2 (e.g., a combined laser processing and punching machine for processing metal sheets). As shown in FIG. 3, the arrangement 1 has a laser processing head 3 and a punching head 4, which are disposed beneath a front hood 5 and arranged on a machine member 6.

Workpieces that are arranged on a workpiece support 7 can be processed with the laser processing head 3, which includes a laser directed vertically downwards and the punch head 4. The workpiece support 7 can be moved in the direction of the arrow 8 forwards and backwards in order to orient a supported workpiece with respect to the processing heads 3, 4. It is also possible, using a transverse carrier 9, which is provided with workpiece receiving members (e.g., clamps), to move a gripped workpiece in the direction of the arrow 10 to the left and to the right in order to orient the workpiece with respect to the processing heads 3, 4.

Figure 1:
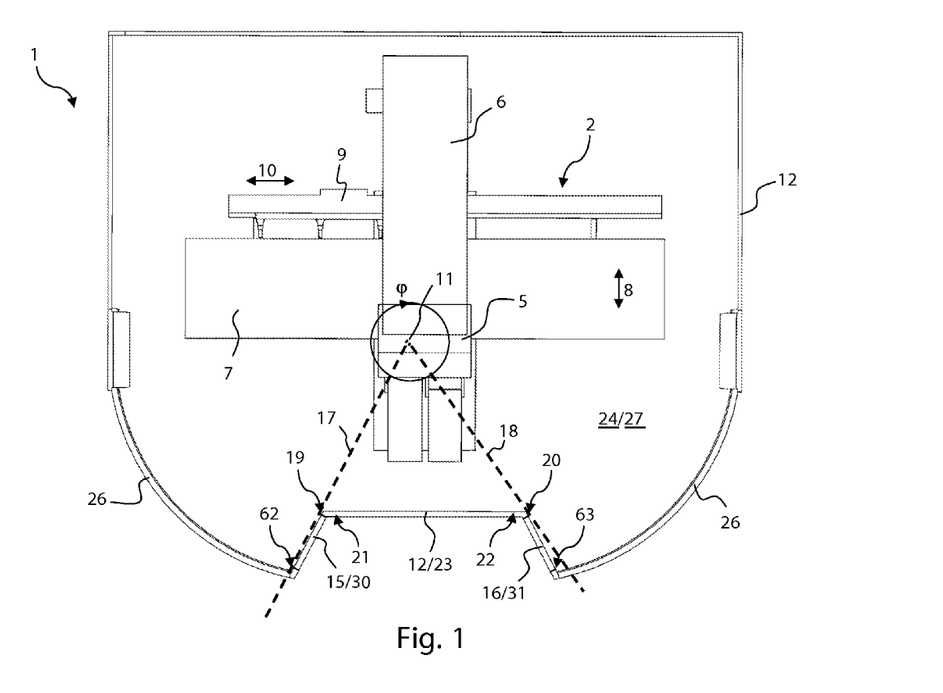
FIG. 1 shows a schematic top view of a laser processing machine arrangement, including two shadowed openings and two additional openings that are each closed with a curved sliding door.
Figure 2:
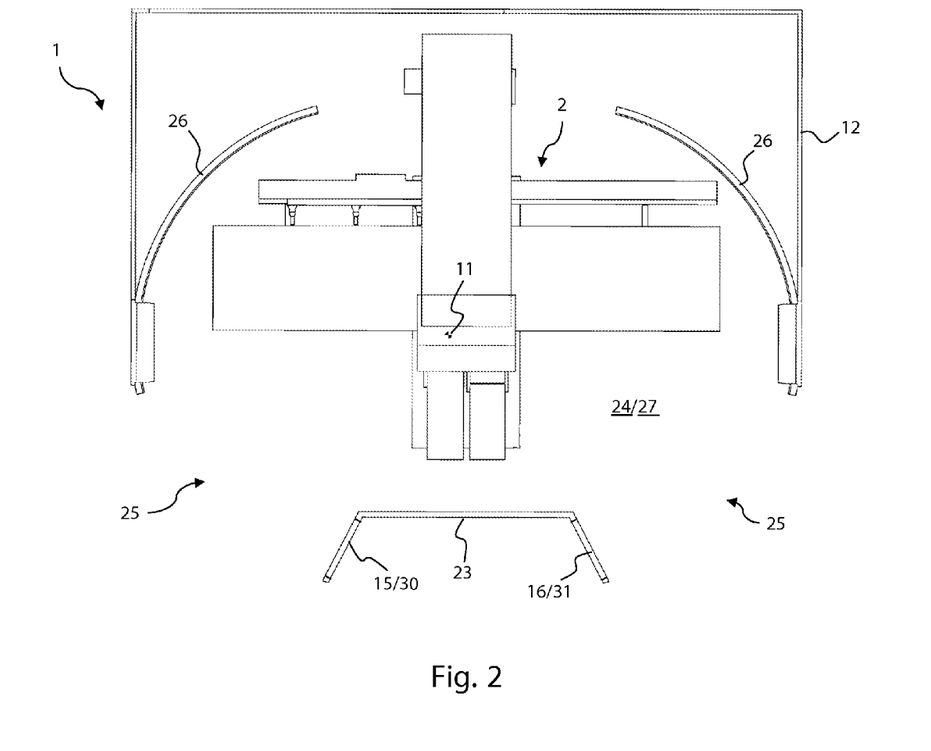
FIG. 2 shows a schematic top view of the laser processing machine arrangement of FIG. 1, with the curved sliding doors open.

During laser processing of a workpiece, the laser beam strikes the workpiece in a region in a processing zone 11, which is indicated with a small checked circle in FIG. 1. From there, the laser radiation is propagated in all directions in a linear manner. This radial propagation of substantially scattered laser radiation can be harmful to people in the vicinity, in particular to their eyes. Therefore, the laser processing machine 2 is surrounded by a laser protection wall 12. The laser protection wall 12 is made of a material (e.g., sheet metal) which is non-permeable with respect to the laser radiation used and non-permeable in the region of viewing windows 14. The viewing windows 14 are formed of a special glass which is non-permeable with respect to the laser radiation used and are constructed in a central element 23 of the laser protection wall 12, upstream of a region where operating devices of the arrangement 1 are also typically arranged.

Figure 4:
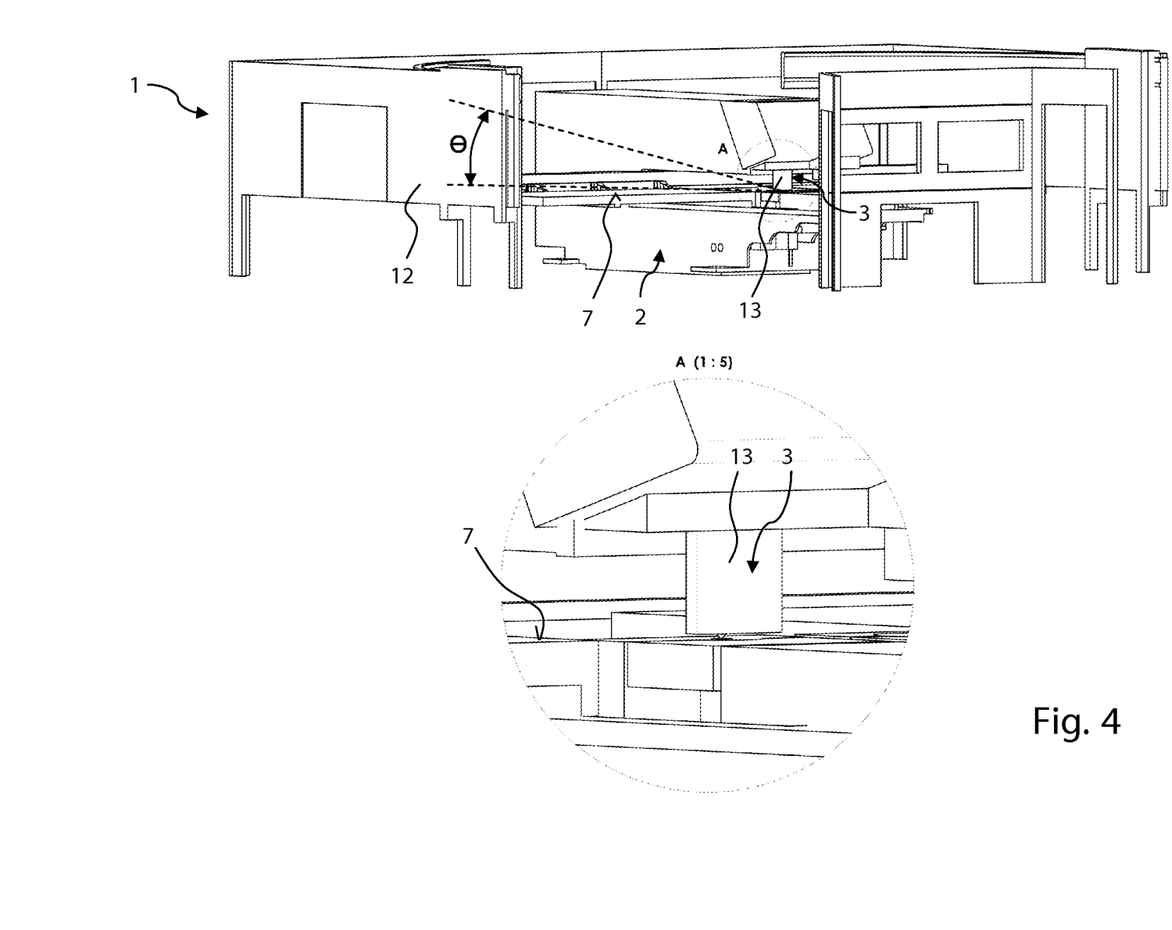
FIG. 4 shows a schematic side view of the laser processing machine arrangement of FIG. 2, with an enlarged, detailed cut-out in the region of the laser processing head.

As shown in FIG. 1, the laser protection wall 12 shields the environment around the processing zone 11 completely (e.g., over all azimuth angles φ from 0 to 360°). As shown in FIG. 4, a shielded vertical region (e.g., the shielded polar angle θ) is, however, limited in the embodiment shown substantially to the local radiation cone which is produced by a radiation delimitation or a gap between the workpiece and/or the workpiece support 7 and the laser processing head 3 and/or a tubular casing 13 of the laser processing head 3. As shown in FIG. 3, the laser protection wall 12 is constructed so as to be open primarily in a lower region close to the floor and further open in an upward direction.

Again with reference to FIG. 1 and FIG. 3, there are provided in the laser protection wall 12 two floor-level openings 15, 16 at both sides of the central element 23. These openings 15, 16 are arranged (e.g., oriented) in the laser protection wall 12 in such a manner that no laser light emitted radially from the processing zone 11 can pass through them. In FIG. 1, beam paths 17, 18 which are nearest the openings 15, 16 are drawn with dotted lines starting from the processing zone 11. Front edges 19, 20 of the openings 15, 16, adjacent portions 21, 22 of the laser protection wall 12, and respective rear edges 62, 63 shadow the openings 15, 16. For the optical safety of persons outside of a danger region 24 surrounded by the laser protection wall 12, it is therefore not necessary to provide the openings 15, 16 with doors which are impermeable with respect to the laser radiation. The openings 15, 16 are therefore also configured so as to be permanently free from barriers (e.g., without doors), which improves the accessibility of the danger region 24, (e.g., to perform set-up operations).

In order to prevent persons entering the danger region 24 through the shadowed openings 15, 16 from being endangered by scattered laser light, a monitoring system 29 is configured. The monitoring system 29 ensures that, when a control region 27, which, in the embodiment shown, is identical to the danger region 24 is entered, the laser beam of the laser processing head 3 is switched off, and preferably, any workpiece transport and/or punching operation is also interrupted. The openings 15, 16 constitute boundary portions 30, 31 of the control region 27, the entry to which is monitored.

To this end, a light grille 28 is configured on the opening 16, an interruption of the control beam thereof signaling that the boundary portion 31 formed by the opening 16 has been entered and causing the laser to be switched off. Owing to the fact that the largest spacing AB in the light grille (e.g., raster) is 90 mm in this instance, even placing only one's head in the danger region 24 will be detected. In the same manner, the opening 15 is secured.

In addition to entering the danger region 24 through the shadowed openings 15, 16, it is also possible to enter the danger region 24 through additional openings 25 which can be closed by laser protection doors 26. The laser protection doors 26 are constructed as sliding doors and are non-permeable with respect to the laser radiation used. The laser protection doors 26 are part of the laser protection wall 12 and are opened in this embodiment for substantially manual workpiece changes.

The laser protection doors 26 have their own protection system 32, which senses an opening of the laser protection doors 26 by a resiliently loaded pressure switch, and which interrupts the workpiece processing operation when the laser protection door 26 is open, and in particular automatically switches off the laser beam on the laser processing head 3. Alternatively, the laser protection doors 26 are electronically unlocked only when the laser is switched off. Whilst FIG. 1 shows the laser protection doors 26 in the closed state, they are illustrated in the open state in FIGS. 2, 3, and 4. Accordingly, the laser processing head 3 can be operated only in the state shown in FIG. 1. It should be noted that the closed laser protection doors 26 overlap minimally with the central element 23.

FIGS. 5 to 9 show another embodiment of a laser processing machine arrangement 1' which is provided with an automatic workpiece supply system. The differences with respect to the previous embodiment are discussed below.

Figure 5:
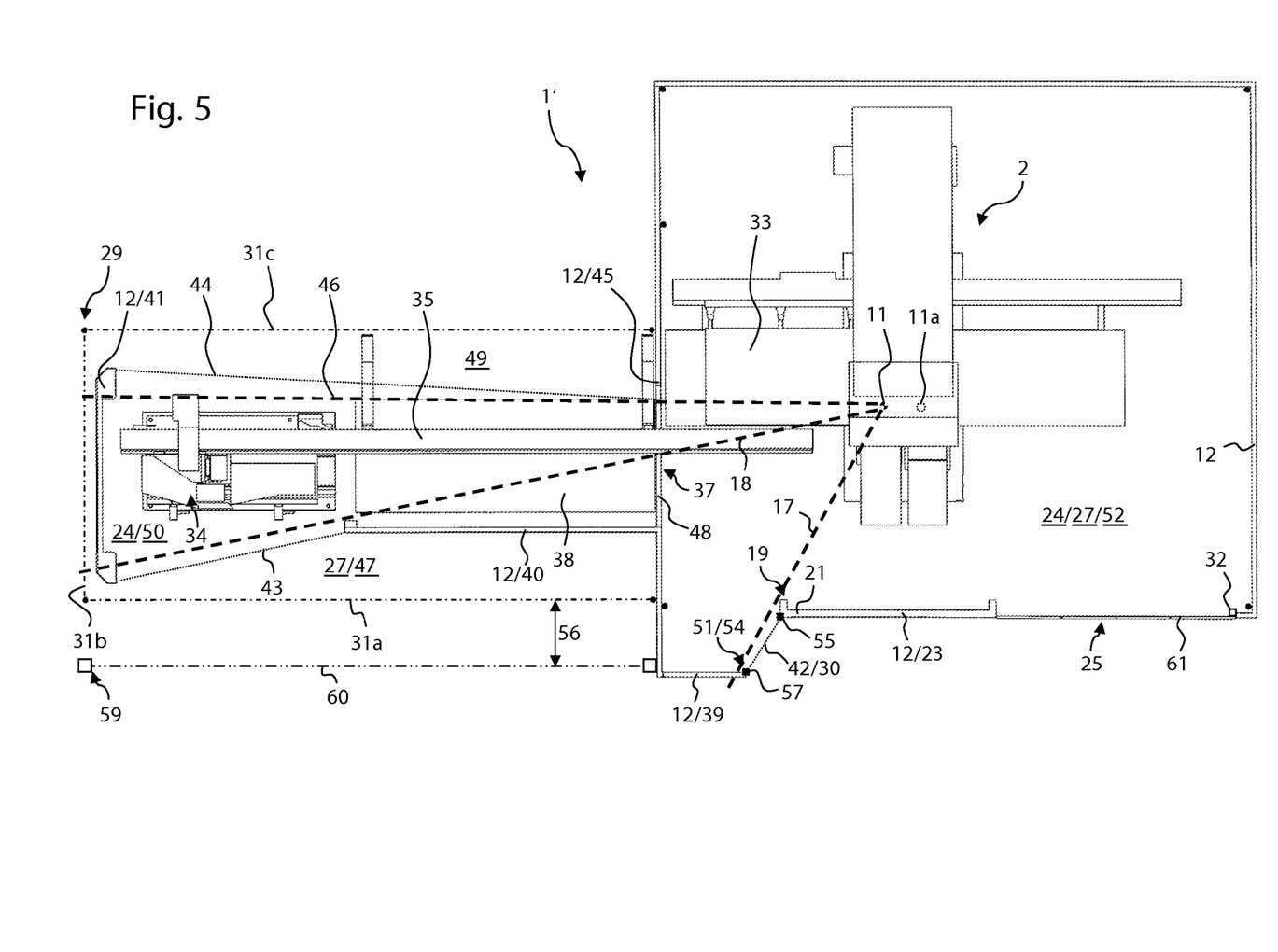
FIG. 5 shows a schematic top view of a laser processing machine arrangement, including an automatic workpiece supply system, three shadowed openings, and a movable portion of a laser protection wall in a closed position.
Figure 7:
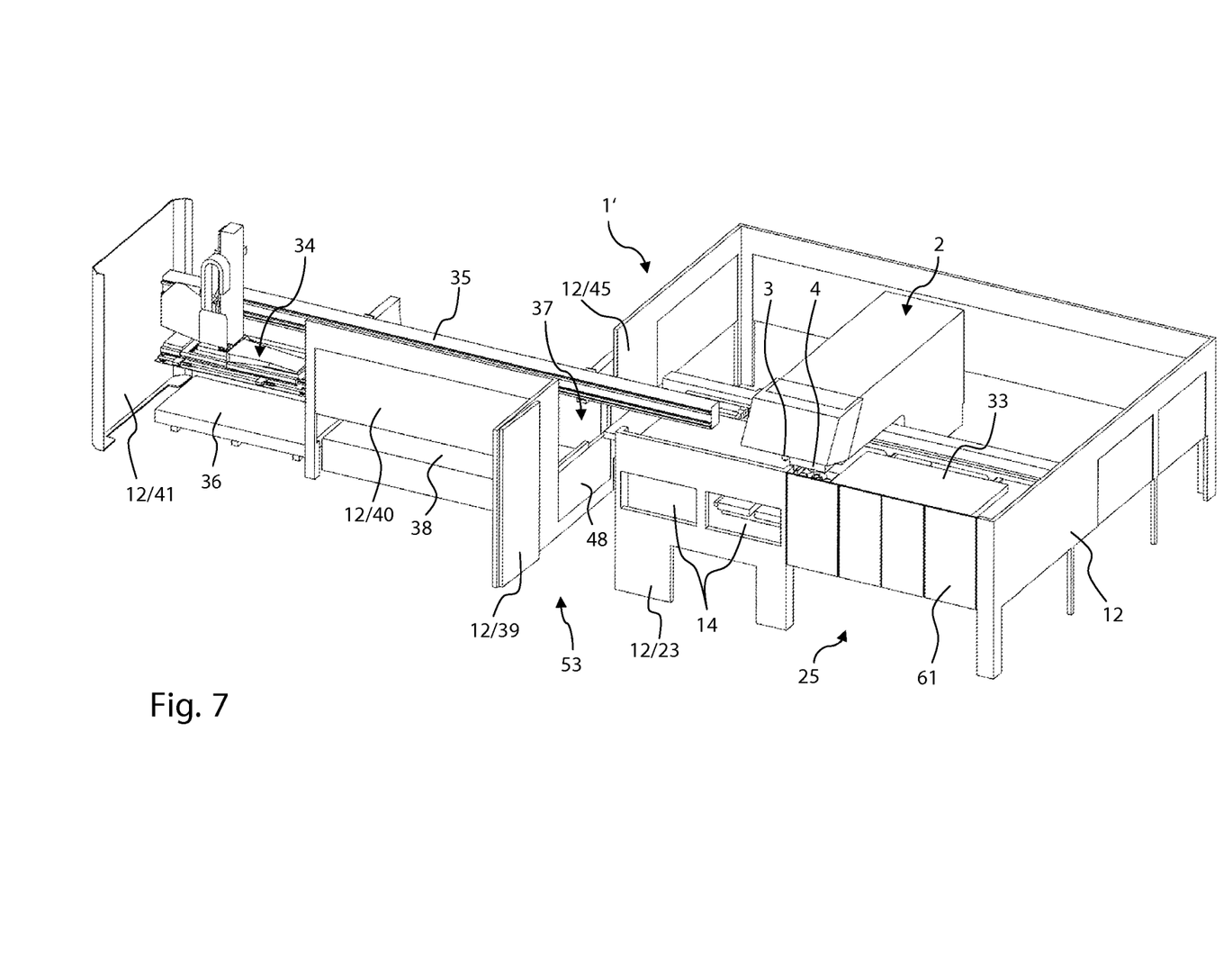
FIG. 7 shows a schematic perspective view of the laser processing machine arrangement of FIG. 6.

As can be seen in particular in FIG. 5 and FIG. 7, the arrangement 1' has a laser processing machine 2 similar to the laser processing machine 2 shown in FIG. 1 and FIG. 3, having a laser processing head 3 and a punching head 4 for processing sheet-like workpieces 33. Workpieces 33 are lifted from a store 36 for unprocessed workpieces (e.g., raw material) by a suction gripper carriage 34 and moved along a guiding path 35 (e.g., a portal) of the suction gripper carriage 34 through a passage 37 to the laser processing machine 2 and deposited. After the processing operation, the workpieces 33 in the region of the laser processing machine 2 are again lifted using the suction gripper carriage 34 and moved through the passage 37 to a store 38 for processed workpieces (e.g., good components).

In order to protect people in the vicinity of the laser processing machine 2 from scattered laser radiation, there is again provided a laser protection wall 12 which is non-permeable with respect to the laser radiation used. The laser protection wall 12 has a large number of portions, in particular a central element 23 with viewing discs of glass which is non-permeable with respect to the laser radiation, a movable portion 39, a portion 40 which is close to the store 38, an impact wall 41, and a portion 45 which is close to the passage 37. The laser protection wall 12 surrounds a danger region 24 in which laser radiation which propagates radially from the processing zone 11 may occur and shields this laser radiation in an outward direction.

The laser protection wall 12 has three openings 42, 43, 44 which are illustrated with dots in FIG. 5. The laser protection wall 12 and these openings 42, 43, 44 are arranged in such a manner that a portion of the laser protection wall 12 adjoining the openings 42, 43, 44 shadows the openings 42, 43, 44. The left portion 21 of the central element 23 in FIG. 5 thus shadows the opening 42 (for example, refer to the beam path 17 closest to the opening 42 with respect of the laser radiation emitted from the processing zone 11 during operation). The opening 43 is shadowed by the left end of the portion 40 close to the store 38 (for example, refer to the beam path 18 closest to the opening 43). The expanded opening 44 is shadowed by the inner portion of the portion 45 close to the passage 37 (for example, refer to the beam path 46 closest to the opening 44). The openings 42, 43, 44, as a result of their shadowed arrangement, also do not require any laser-impermeable cover during operation of the laser processing head 3, and are accordingly also constructed in a barrier-free manner without any door.

In order to protect from the laser radiation persons entering the danger region 24 defined by the laser protection wall 12 and the openings 42, 43, 44 through the openings 42, 43, 44, an optical monitoring system 29 is provided (refer to the circles filled in a black color and rectangles in FIG. 5, which represent light grille or photoelectric barrier stations). The monitoring system 29 monitors a control region 27, which includes the entire danger region 24 and an additional region 47 in front of the openings 43, 44 at the outer limits thereof. Outer boundary portions 31a, 31b, 31c of the additional region 47 are illustrated in FIG. 5 with dot-dash lines. Furthermore, the opening 42 constitutes a boundary portion 30 of the control region 27. The monitoring system 29 also carries out monitoring along an inner side at a few portions of the laser protection wall 12.

With the monitoring system 29, it is possible to identify when a person enters the control region 27. In particular, it is possible to monitor to this end an interruption of a control beam (e.g., a light grille) formed at the boundary portions 30, 31a, 31b, 31c. When a boundary portion 30, 31a, 31b, 31c is entered, the light grille is interrupted, and the laser in the laser processing head 3 is switched off. Preferably, all machine movements in the arrangement 1' (e.g., movements of the suction gripper carriage 34) are then also stopped.

There is also provided an additional opening 25 which is not shadowed and which is covered with a laser protection door 61 which is constructed as a telescope-like door. With a protection system 32, which includes a resiliently loaded pressure switch, it is ensured that, when the laser protection door 61 is opened, the laser processing head 3 and any machine movement are switched off.

Figure 8:
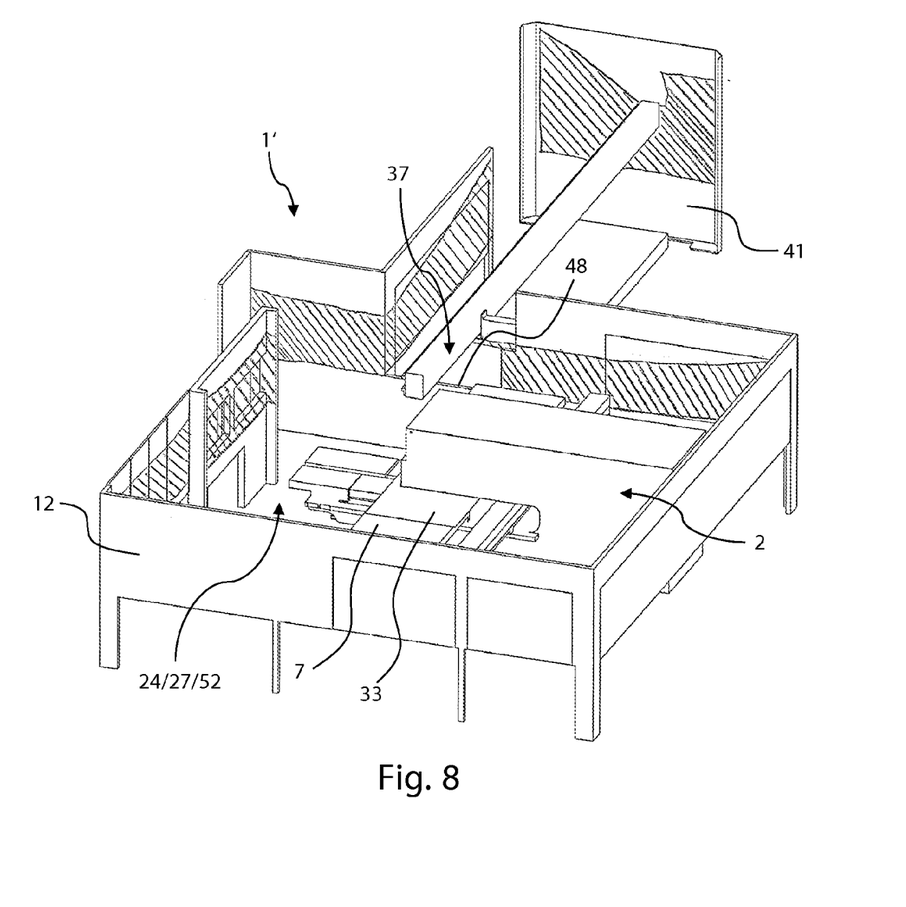
FIG. 8 shows a schematic perspective view of the laser processing machine arrangement of FIG. 5, with a laser protection shield in a retracted position and with irradiated regions of the laser protection wall marked with shading.
Figure 9:
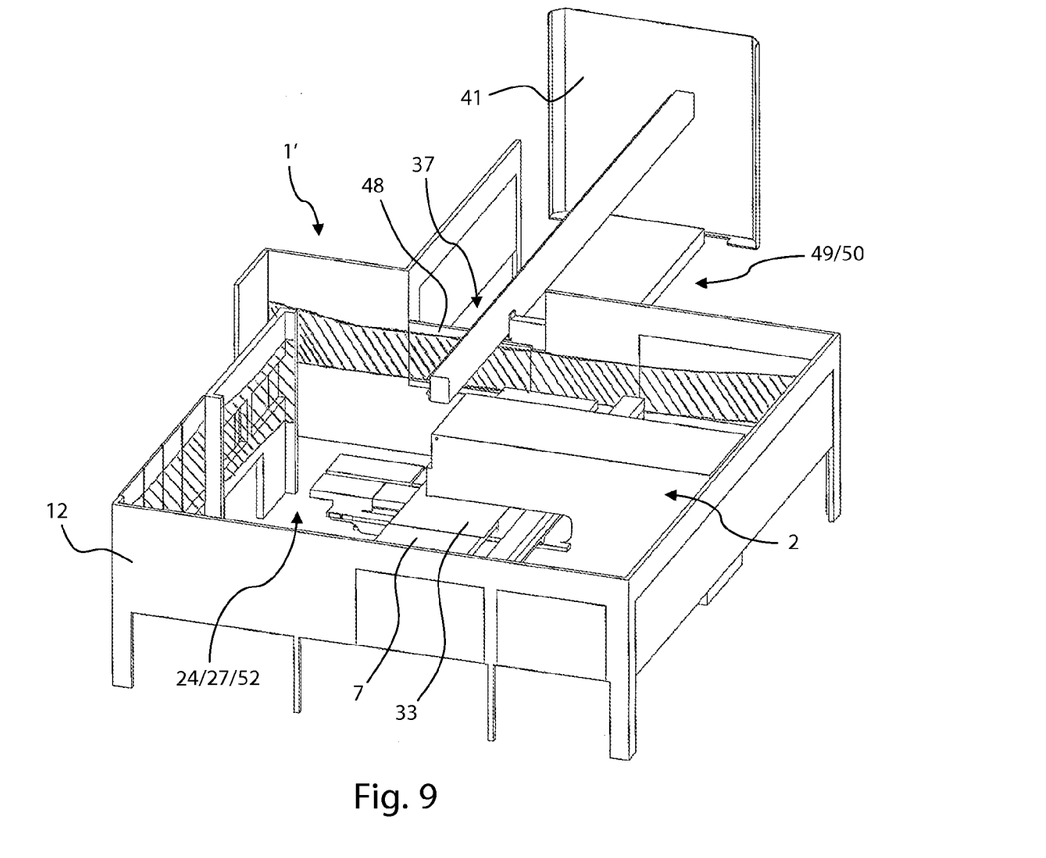
FIG. 9 shows a schematic perspective view of the laser processing machine arrangement of FIG. 8 with the laser protection shield in a deployed position.

In order to make the laser processing machine 2 more efficient and in particular to reduce machine downtimes, a movable laser protection shield 48 may be provided in the region of the passage 37 (refer to FIG. 9 with the laser protection shield 48 in the deployed position and FIG. 8 with the laser protection shield 48 in the retracted position). When the laser protection shield 48 is deployed in an upward direction (lifting gate), it shadows a region 49 of the control region 27, which region is at the rear in FIG. 9 beyond the passage 37 and also includes a rear region 50 of the danger region 24 located beyond the passage 37. Entering the shadowed region 49 of the control region 27 or the shadowed region 50 of the danger region 24 is then possible without danger, even when the laser processing in the remaining control region 52 is active.

In FIGS. 8 and 9, laser wall portions which are each irradiated with laser radiation are drawn with shading. When the laser protection shield 48 is retracted (as shown in FIG. 8), the laser radiation propagates as far as the impact shield 41. When the laser protection shield 48 is deployed, the laser radiation is blocked at the laser protection shield 48, and the region 49 is completely shadowed. In FIGS. 8 and 9, it can also clearly be seen that the laser protection wall 12 is not required at floor or ceiling level since, as a result of the workpiece 33, the workpiece support 7, the laser processing head, and/or a casing of the laser processing head, only a relatively small spatial angular range in the vertical direction (e.g., a small polar angular range) is irradiated.

When a movable radiation shield 48 is used, the monitoring system 29 is configured in such a manner that the boundary portions 31a, 31b, 31c can be entered when the laser protection shield 48 is deployed, without the laser processing automatically being switched off. Then, in the shadowed region 49, it is possible to work in parallel with the main processing operation (during the laser processing operation in the remaining control region 52) In particular, workpieces 33 can be moved to the store 36 for unprocessed workpieces and removed from the store 38 for processed workpieces.

Figure 6:
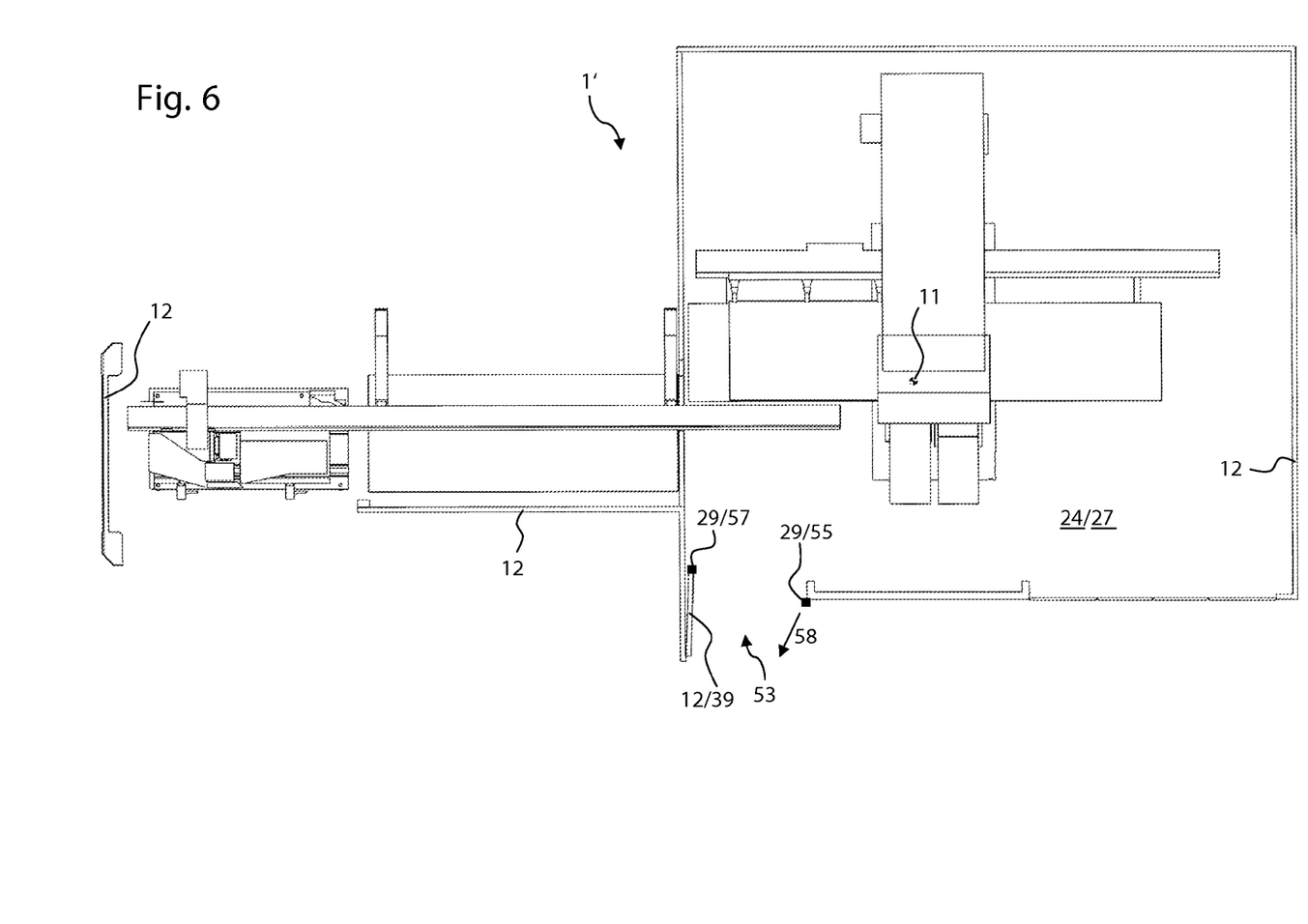
FIG. 6 shows a schematic top view of the laser processing machine arrangement of FIG. 5, with the movable portion in an open position.

As another specific feature of the arrangement 1', the opening 42 adjoins the movable portion 39 (e.g., a pivoting gate) of the laser protection wall 12 (refer to FIG. 5, FIG. 6, and FIG. 7). When the movable portion 39 is pivoted into an open position, as illustrated in FIG. 6 and FIG. 7 along the shadowed opening 42, an access 53 to the danger region 24 is enlarged. However, switching off of the laser processing head 3 must then be ensured, since the increased access 53 for the most part is not shadowed from laser light which could be emitted from the processing zone 11 during operation.

To this end, the monitoring system 29 has at the front edge 19 of the opening 42 a transmission device 55 and at the outer end 54 of the movable portion 39 a receiver device 57, the fixed transmission device 55 directing its control beam in a fixed direction in accordance with the arrow 58. When the receiving device 57 is not arranged in the arrow direction, the receiving device 57 cannot receive the control beam, which excludes a notification of the opening 42 or the boundary portion 30 as being free. However, if the receiving device 57 is arranged in the direction of the arrow, which is always the case when the movable portion 39 is in the closed position (as shown in FIG. 5), the opening 42 (as long as no one is in the opening 42) can be identified as being free, which enables the operation of the laser processing head 3. In the latter case, the receiving device 57 is arranged at the edge 51 of the shadowed opening 42 opposite the front edge 19. Accordingly, in the closed position of the movable portion 39 illustrated in FIG. 5, a laser processing operation can be carried out, but not in the open position of the movable portion 39, as shown in FIGS. 6 and 7.

As can be seen in FIG. 5, there is further configured in front of the boundary portion 31a a pre-warning portion 60 which is monitored by an optical pre-warning system 59). The pre-warning portion 60 which is marked with a double-dotted and dashed line is in this instance approximately 40 cm in front of the boundary portion 31a (refer to spacing 56). If a person enters the pre-warning portion 60, a horn is activated and indicates to the person that another approach to the arrangement 1' in the region of the automation, in particular entering the boundary portion 31a, will interrupt the workpiece processing operation. It is thereby possible to prevent unintentional entry of the control region 27 during the workpiece processing operation.

It should be noted that the laser processing machine 2 of the arrangement 1' in place of a punching head 4 may also have an additional laser processing head, for example, with an associated laser having a wavelength and/or power that are different from those of the laser in the processing head 3. The openings 42, 43, 44 are also arranged so as to be shadowed with respect to the additional processing zone 11a of this additional laser processing head.

In some embodiments, a protection arrangement for a laser processing machine is proposed in which a laser protection wall, which is typically constructed in several parts, leaves passages which are shadowed internally with respect to a source of radially scattering laser light and through which it is possible to enter and leave the danger space internally without any barriers and without loss of time. Automatic release of the laser processing operation can be carried out when a machine photoelectric barrier or the like is confirmed. Owing to the barrier-free passages, there is no waiting time for opening or closing doors. In principle, an operator has both hands free for operating tasks and does not require them in particular for operating doors. There is no need to fear failure of machine actuators at entrances since no machine actuators are required. The placement of modules (e.g., individual components) of the laser protection wall is extremely flexible, and in particular, it is possible to produce almost any angle between individual modules just as long as the shadowing of the door-free passages or accesses is ensured. The shadowed door-free accesses or the danger region as a whole are monitored, preferably in a contact-free manner, and preferably optically (e.g., with photoelectric barriers or light grilles). Video monitoring, including 3D video monitoring, is also conceivable. Owing to the monitoring, provision is made for the laser to be switched off automatically when the danger region within the laser protection wall is entered.

LIST OF REFERENCE NUMERALS 1, 1' Laser processing machine arrangement
2 Laser processing machine
3 Laser processing head
4 Punching head
5 Front cover
6 Machine body
7 Workpiece support
8 Arrow direction (forwards/backwards)
9 Transverse carrier
10 Arrow direction (left/right)
11 Processing zone
12 Laser protection wall
13 Casing 14 Viewing window
15, 16 Shadowed opening
17, 18 Beam path closest to opening
19, 20 Front edge
21, 22 Part-portion
23 Central element
24 Danger region
25 Additional opening
26 Laser protection door (sliding door)
27 Control region
28 Light grille
29 Monitoring system
30, 31 Boundary portion
31a-31c Boundary portion
32 Protection system
33 Workpiece
34 Suction gripper carriage
35 Guiding path
36 Store for unprocessed workpieces
37 Passage
38 Store for processed workpieces
39 Movable part-portion
40 Part-portion close to store
41 Impact wall
42, 43, 44 Shadowed opening
45 Part-portion close to passage
46 Beam path closest to opening
47 Additional region of the control region
48 Laser protection shield
49 Shadowed part-region of the control region
50 Shadowed part-region of the danger region
51 Opposing edge
52 Remaining control region
53 Enlarged access
54 Outer end of the movable part-portion
55 Transmission device
56 Spacing
57 Receiving device
58 Arrow (transmission direction of the control beam)
59 Pre-warning system
60 Pre-warning portion
61 Laser protection door (telescope-like door)
62, 63 Rear edge
AB Spacing (light grille)
φ Azimuth angle
θ Polar angle A number of embodiments have been described. Nevertheless, it will be understood that various modifications may be made without departing from the spirit and scope of these embodiments. Accordingly, other embodiments are within the scope of the following claims.

What is claimed is:

1. A laser processing machine arrangement, comprising:
a laser processing head for laser processing a workpiece, the workpiece comprising a processing zone from which laser radiation is emitted radially during operation of the laser processing head;
a laser protection wall surrounding the laser processing head and a danger region disposed around the laser processing head, the laser protection wall shielding the laser radiation that is emitted radially from the processing zone during operation; and
at least one opening in the laser protection wall, through which the danger region can be entered, wherein the laser protection wall and the at least one opening in the laser protection wall are arranged in such a manner that the at least one opening is completely shadowed by the laser protection wall or is completely shadowed with cooperation of the laser protection wall from the laser radiation that is emitted radially from the processing zone during operation of the laser processing head.

2. The laser processing machine arrangement according to claim 1, wherein the at least one opening is constructed in a barrier-free manner.

3. The laser processing machine arrangement according to claim 1, wherein the at least one opening is disposed at floor level and extends at least 2.20 m in an upward direction.

4. The laser processing machine arrangement according to claim 1, wherein the at least one opening is located at least partially behind a shadowing portion of the laser protection wall, the at least one opening having a front edge and a rear edge with respect to the processing zone, the front edge and an adjacent portion of the laser protection wall shadowing the at least one opening along a length of the at least one opening that extends to the rear edge.

5. The laser processing machine arrangement according to claim 1, further including a monitoring system that registers entry of a control region comprising at least the danger region, the monitoring system constructed to automatically switch off the laser processing head when the monitoring system registers entry of the control region.

6. The laser processing machine arrangement according to claim 5, wherein the monitoring system is an optical monitoring system that comprises a light grille.

7. The laser processing machine arrangement according to claim 5, wherein the monitoring system monitors at least one boundary portion of the control region, the monitoring system permitting operation of the laser processing head only while the at least one boundary portion is identified as being free, and the laser processing head being automatically switched off when the at least one boundary portion is entered.

8. The laser processing machine arrangement according to claim 7, wherein a boundary portion is formed by a shadowed opening, such that a movable portion of the laser protection wall that at least in part defines the shadowed opening is able to be moved or pivoted between an open position and a closed position, wherein the open position enlarges an access to the danger region adjacent the at least one opening, and the closed position limits the access to the danger region to the at least one opening, wherein the monitoring system permits the boundary portion to be identified as being free only when the movable portion is in the closed position.

9. The laser processing machine arrangement according to claim 8, wherein the monitoring system comprises a transmission device and a receiving device, and one of the devices is arranged on the edge of the at least one opening on the movable portion of the laser protection wall, and the other of the devices is arranged on an opposing edge of the at least one opening on a non-movable portion of the laser protection wall.

10. The laser processing machine arrangement according to claim 5, further including a pre-warning system that monitors a pre-warning portion located upstream of a boundary portion and that transmits an optical and/or acoustic pre-warning signal when the pre-warning portion is entered, the pre-warning portion being spaced apart from the boundary portion by at least 40 cm.

11. The laser processing machine arrangement according to claim 5, further comprising at least one movable laser protection shield that can be configured in a deployed position to define a portion of the control region and a portion of the danger region that are completely shadowed from the laser radiation emitted radially from the processing zone during operation of the laser processing head, wherein with the laser protection shield in the deployed position, the monitoring system does not automatically switch off the laser processing head when the portion of the control region is entered, and the laser protection shield prevents entry into a remaining region of the control region.

12. The laser processing machine arrangement according to claim 1, wherein the laser protection wall further comprises at least one additional opening that can be blocked by a laser protection door and through which the danger region can be entered, the laser processing arrangement further comprising a protection system that automatically switches off the laser processing head when the laser protection door is opened.

13. The laser processing machine arrangement according to claim 1, wherein the laser radiation that is emitted radially from the processing zone during operation is partially shadowed by the workpiece, and/or by a workpiece supply system, and/or by the laser processing head, and/or by a casing of the laser processing head, such that the laser protection wall is partially constructed to be open in such shadowed spatial angular ranges.

14. The laser processing machine arrangement according to claim 1, wherein the laser processing head comprises a laser having a wavelength in the non-visible range.

15. The laser processing machine arrangement according to claim 14, wherein the wavelength of the laser is in the infrared range.

16. The laser processing machine arrangement according to claim 1, wherein the laser processing head comprises a laser whose laser beam is orientated in a downward vertical direction.

17. The laser processing machine arrangement according to claim 1, further comprising a punching head disposed in the danger region.

* * * * *